Patented Oct. 3, 1950

2,524,380

UNITED STATES PATENT OFFICE 2,524,380

GLASS CLEANING COMPOSITION

Marcellus T. Flaxman, Los Angeles, Calif., assignor to Wilco Company, Los Angeles, Calif., a corporation of California No Drawing. Application December 19, 1945, Serial No. 636,077

2 Claims. (Cl. 252—139)

This invention relates to glass cleaners, and particularly to solutions adapted to be sprayed or otherwise spread upon glass surfaces and thereafter to be removed by wiping the surfaces dry as with a cloth or paper towel.

Glass cleaning solutions have been commonly used both for the purpose of cleaning automobile windshields, which has become a large field of use in itself, and also for the cleaning of windows, the latter use having become quite extensive and having resulted in wide distribution of such products.

Some liquid glass cleaners heretofore used have tended to leave objectionable deposits where the glass surfaces have not been wiped entirely dry, especially where certain adjuvants have been employed. Again, some cleaners have commonly been conducive to subsequent development of a hazy film upon the glass surfaces within an unreasonably short time after the surfaces have been cleaned.

These undesirable results are particularly objectionable in connection with automobile windshields. It is also a common experience with windshields, following use of some liquid cleaners, that subsequent encounter with rain or fog creates beads of water or badly spotted or streaked conditions on the glass which interfere with vision. These conditions are not readily overcome by the operation of the windshield wipers conventionally employed on windshields. Even though a windshield is apparently clean, these conditions, nevertheless, commonly exist. In seeking an explanation of the development of such undesirable conditions, I have discovered that it is not sufficient to remove, by ordinary means, the usual foreign matter and surface-soiling agents which commonly accumulate on windshields during use. Apparently this is because ordinary cleaning does not remove from the glass surfaces formations or deposits which are responsible for the difficulties observed. It appears probable, from all available information, that these objectionable effects are the direct result of what may be called a "weathering" action on the surface of the glass which prevents even wetting of glass surfaces by water. This phenomenon may be due to a possible water proofing of the glass surface as a result of the so-called weathering. It is known that weathered glass surfaces adsorb very tenaciously certain materials such as mineral oil particles collected from air contaminated with automotive exhaust fumes. It is probable that such adsorption contributes to the failure of water to wet the glass surfaces. An even more likely phenomenon which is responsible for the failure to wet weathered glass surfaces with uniform water films is adsorption of air by the weathered glass surfaces.

Whatever the cause of these difficulties, I have further discovered that, in order to obtain desirable results, it is necessary to apply cleansing materials to windshield surfaces, and similar glass surfaces exposed to the weather, which materials are capable of removing the products of weathering sufficiently at least to reduce for a time the tendency of the glass surfaces to readsorb air or other foreign matter and to insure even wetting of the glass by rain or fog. However, the selection of chemical agents for the removal of products of weathering must be carefully made in order to avoid formation or reformation of objectionable surface conditions as a result of the use of such chemical agents themselves. Thus, it is essential that the cleansing agent employed be not responsible for accelerating chemical changes in the glass surface which will produce any of the described weathering effects or other objectionable conditions. For example, the presence of some alkaline agents, such as caustic soda and trisodium phosphate, is conducive to particularly rapid chemical changes in glass surfaces of the weathering type. Some constituents which have been employed have been fairly satisfactory if used in sufficiently low percentages but so far none of these has proved to be as acceptable as certain phosphates constituting the important aspects of the present invention.

It is also important in selecting chemical agents that they have the property upon drying of leaving deposits which shall be sufficiently transparent or translucent as not to interfere noticeably with vision. This is necessary because it is inevitable that some of the solution used in cleaning windshields and other glass windows will not be removed, due either to rapid drying or carelessness.

An important object of this invention, therefore, is to provide a liquid glass cleaner which will leave a clean glass surface that will be readily wetted by either rain or fog so that an even water film will form upon the surface of a windshield, especially under the action of a windshield wiper, whereby material interference with a driver's vision will be avoided.

Another important object of this invention is to provide a liquid glass cleaner which will not only insure ready wetting of a glass surface by water but also will not result in the formation of objectionable film or haze upon drying, will not result in early formation of objectionable reaction products by attack on the glass, and will not otherwise accelerate weathering.

A further object of the invention is to provide a liquid glass cleaner whose constituents, in the event of drying of the cleaner upon the surface so as to leave residual deposits, will be sufficiently translucent as not to interfere with vision.

I have found that all of the above objects may be accomplished by employing as a liquid glass cleaner a water solution, or a water and alcohol solution, any one of the members of a very small group of phosphates some of which appear to exist only in water solution. These are employed with a small percentage of ammonium hydroxide.

The mentioned group of phosphates consists of the following: disodium diammonium pyrophosphate, $Na_2(NH_4)_2P_2O_7$; trisodium monoammonium pyrophosphate, $Na_3(NH_4)P_2O_7$; dipotassium diammonium pyrophosphate,

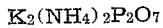

$$K_2(NH_4)_2P_2O_7$$

tripotassium monoammonium pyrophosphate, $K_3(NH_4)P_2O_7$; disodium monopotassium monoammonium pyrophosphate $Na_2K(NH_4)P_2O_7$; and dipotassium monosodium monoammonium pyrophosphate $K_2Na(NH_4)P_2O_7$.

Obviously mixtures of this pyrophosphates may be used if desired, although it is probable that a single salt will be employed, and for practical purposes it now appears that the mentioned disodium monopotassium monoammonium pyrophosphate is most acceptable from a commercial standpoint.

Each of the alkali metal ammonium pyrophosphates above given commonly exists only in solution and decomposes to the corresponding acid pyrophosphate upon removal of the water as by drying, but each of these ammonium pyrophosphates is stable in solution.

In practice I employ a small percentage normally between about 0.05% and about 0.1%, of the selected alkali metal ammonium pyrophosphate or a mixture of the mentioned phosphates in water solution with or without an appropriate alcohol. Preferably commercial distilled water is employed, and ordinarily ethyl alcohol or a propyl alcohol is used, preferably isopropyl alcohol. Usually, the solution comprises about 20% of the selected alcohol and about 80% of distilled water. The selected alkali metal ammonium pyrophosphate or the indicated mixture of pyrophosphates will have been formed in water solution and will have been introduced in any suitable manner into the water and alcohol mixture.

Preferably, free ammonium hydroxide will be present in the final solution in amount to yield a pH value of about 10. This may be accomplished by adding from 0.05% to 0.2% by volume of commercial ammonium hydroxide having a specific gravity of about 0.9 and containing about 28% to 30% by weight of ammonia ($NH_3$). The exact amount of ammonium hydroxide added will vary somewhat with the particular salt employed, the functional results desired, and the acidity of the alcohol and commercial distilled water employed. A larger proportion of ammonia may be used, but no added advantage is obtained.

The function of the various alkali metal ammonium pyrophosphates is primarily to remove the film which develops on glass surfaces, especially when exposed to the weather as on the outside of windshields and windows. The pH of the solution in the absence of free ammonium hydroxide is about 9 or ordinarily in the range of about 8.5 to 9.1, but this value sometimes is low for the best results because the removal of the film produced on glass by weathering is not rapid at this pH value. On the other hand, a pH value of about 10, or between about 9.5 and about 10.2 is very desirable since film removal in this pH range is more rapidly accomplished. Thus, film removal becomes increasingly rapid as the pH is increased above 9, particularly as it is increased above about 9.5, the rapidity being most satisfactory at about pH 10. However, excess ammonia may be omitted in instances where rapidity of film removal is not important.

The above-indicated range of the alkali metal ammonium pyrophosphate, from about 0.05% to about 0.10%, represents the ordinary practical operating range. If less than about 0.05% is employed, under most circumstances it will be found that the efficiency of film removal is reduced with respect to the time required. As to the upper end of the range, it appears that the maximum cleansing effect is obtained when about 0.10% is used. The proportion may be increased in the product as it is to be finally used, perhaps to 1%, but apparently no additional benefit is obtained and the net result is an increase in cost of production and the possibility of excessive translucent deposits upon drying. However, from the initial manufacturing standpoint, it is preferable to produce a concentrate and for this purpose the above-indicated percentages of the pyrophosphate and the alcohol may be increased about four times, for example. Thus, the concentrate may consist of about 20% water, about 80% alcohol, and from about 0.2% to about 0.4% of the ammonium pyrophosphate selected.

Obviously other percentages may be employed for the concentrate but it is desirable to have an appreciable proportion of water, apparently at least about 10% water, to maintain the ammonium pyrophosphate in at least partial solution in the containers in which it is shipped or stored.

The function of the alcohol, in addition to its general cleaning properties, is to insure good wetting and spreading on glass surfaces and at the same time to provide desirable quick drying properties especially for cold weather uses. If these properties are not required in the cleaner, it would then be permissible to omit alcohol entirely. However, such a situation would rarely be desirable, and in commercial practice alcohol possibly would always be employed. As to the wetting and spreading function, in some instances it is very desirable to include a synthetic organic surface active agent for the purpose of increasing the detergency rate, and also in some instances wherein alcohol would be objectionable the wetting agent provides the desired reduction of surface tension. Often the alcohol and wetting agent may be used together to supplement one another. Selection of a wetting agent must be based on a number of factors, one of the most important being the mutual chemical stability of the salt and wetting agent. Two commercial materials in particular have been found to be satisfactory for this purpose. The first of these is Tergitol 7, which is a sodium alkyl sulfate and specifically sodium heptadecyl sulfate. The second is Santomerse D, which is a salt of an alkyl aryl sulfonic acid. (It is probably a sodium salt but the exact chemical form is not known.) Other wetting agents in the general class of the anionic wetting agents will be suitable, as well as surface active agents of other classes, although it has been found that the cationic agents are in general not useable. Such agents have the additional advantage of reducing the tendency of windshields to fog on humid nights, due possibly to a slight residue of this agent which remains after cleaning and drying. The content would ordinarily range between about 0.01% and 0.10%.

As has been previously stated the preferred alcohol to be used is isopropyl alcohol. This preference is based upon the fact that it offers all of the indicated advantages and at the same time is not noticeably injurious to paints and lacquers under ordinary conditions of use. Where lacquers and paints are to be encountered which are rather highly resistant to attack, normal propyl alcohol may be employed because it has wetting, spreading and drying properties similar to those of isopropyl alcohol.

Insofar as the isopropyl alcohol content is concerned, this is not restricted to the 20% indicated for the final commercial product but might vary from perhaps 5% or 10%, up through a practical range to perhaps 50%, where important for some particular use; for example, where extremely rapid drying is required, or under very cold weather conditions to facilitate drying and to prevent freezing.

Instead of propyl alcohols, methyl and ethyl alcohols, constituting the other members of the lower aliphatic alcohols, might be substituted where poorer wetting and spreading properties are acceptable. However, larger proportions of these alcohols would ordinarily be required. Higher aliphatic alcohols are generally not acceptable because they attack lacquers and paints too readily.

In using the liquid glass cleaners of this invention, satisfactory application may be obtained by spraying or by wiping on with a cloth, as is true of other liquid glass cleaners. Should it be that haste prevents thorough drying of the surface being cleaned, the pyrophosphate appearing in undried places soon forms into semi-transparent or translucent crystals which have a minimum effect on vision.

Another advantage of the employment of the various alkali metal ammonium pyrophosphates herein disclosed is that, after application and drying upon glass surfaces, they decompose to form the corresponding alkali metal hydrogen pyrophosphates, with the result that the pH value drops to a value below that at which film reformation is accelerated. This has been determined by the application of phenolphthalein or other suitable indicators to glass surfaces. When a glass surface is still wet with the liquid cleaner so that decomposition has not yet taken place, the indicator shows alkalinity; but when the surface has dried and is then wet with water, phenolphthalein fails to indicate alkalinity. For example, when an aqueuos solution containing 0.06% of disodium potassium ammonium pyrophosphate was applied to a glass surface a definite pink color reaction to phenolphthalein was obtained. When the water film was allowed to largely evaporate and was again tested with this same indicator no color reaction was observed, indicating that the pH of the liquid had decreased to at least a value of about 8. The same result is obtained when the surface is then moistened with water and tested with phenolphthalein.

Inasmuch as the described potassium and sodium ammonium pyrophosphates do not appear to exist in dry state, it becomes necessary to make them as required. For this purpose a water solution of disodium dihydrogen pyrophosphate, or the corresponding potassium salt, is used as a starting material. In order to produce the diammonium pyrophosphate, ammonium hydroxide is added to the water solution in stoichiometric proportions to yield the disodium (or dipotassium) diammonium pyrophosphate. When the corresponding monoammonium prophosphate is desired, both ammonium hydroxide and sodium hydroxide (or potassium hydroxide) are added in stoichiometric proportions. The result is a stable water solution of the desired alkali metal ammonium pyrophosphate, such as trisodium monoammonium and disodium monopotassium monoammonium pyrophosphates. As is apparent from the foregoing disclosure, the term "alkali metal" is intended to refer only to the commonly known sodium and potassium.

Various modifications, at least of some of the aspects of the invention herein disclosed will be apparent to those skilled in the art. It is, therefore, intended to cover all those variations which fall within the scope of the following claims.

I claim as my invention:

1. A glass cleaning composition consisting essentially of: water; between about 10% and about 50% of a lower aliphatic alcohol of the class consisting of methyl, ethyl, and propyl alcohols; and between about 0.05% and about 1% of an alkali metal ammonium pyrophosphate.

2. A composition according to claim 1 containing a minor proportion of ammonium hydroxide sufficient to produce a pH of at least 9.5.

MARCELLUS T. FLAXMAN.

REFERENCES CITED

The following references are of record in the file of this patent:

UNITED STATES PATENTS

| Number | Name | Date |
|--------|------|------|
| 2,031,827 | Fiske | Feb. 25, 1936 |
| 2,079,793 | Donlan | May 11, 1937 |
| 2,313,425 | Flaxman | Mar. 9, 1943 |

OTHER REFERENCES

Inorganic and Theoretical Chem.; Mellor, vol. 2, (1922), page 876.

Certificate of Correction

Patent No. 2,524,380								October 3, 1950

MARCELLUS T. FLAXMAN

It is hereby certified that error appears in the printed specification of the above numbered patent requiring correction as follows:

Column 3, line 14, after the comma and before the word "any" insert *of*; line 30, for "this" read *these*; column 6, line 23, for "prophosphate" read *pyrophosphate*; line 48, after "least" insert *about*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*